United States Patent
Schürmann et al.

(10) Patent No.: US 6,598,636 B1
(45) Date of Patent: Jul. 29, 2003

(54) METHOD FOR FIXING A RING MADE OF A SOUND-ABSORBING MATERIAL ON A RIM AND MOTOR VEHICLE WHEEL HAVING A RING MADE OF SOUND-ABSORBING MATERIAL FIXED ON THE RIM

(75) Inventors: Oliver Schürmann, Langenhagen (DE); Andreas Dieckmann, Hannover (DE); Anton Steiner, Hannover (DE); Thomas Dodt, Stadthagen (DE); Frank Gauterin, Neustadt (DE); Mehmet Sadettin Fidan, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/673,636
(22) PCT Filed: Apr. 22, 1999
(86) PCT No.: PCT/EP99/02714
§ 371 (c)(1),
(2), (4) Date: Jan. 5, 2001
(87) PCT Pub. No.: WO99/55542
PCT Pub. Date: Nov. 4, 1999

(30) Foreign Application Priority Data

Apr. 29, 1998 (DE) .......................... 198 19 128

(51) Int. Cl.$^7$ .............. B60C 5/00; B60C 5/12; B60C 19/00; B29D 30/00
(52) U.S. Cl. .............. 152/450; 152/157; 152/375; 152/381.6; 156/110.1
(58) Field of Search .............. 152/151, 155, 152/157, 165, 166, 450, 375, 378 R, 381.6; 156/110.1

(56) References Cited

U.S. PATENT DOCUMENTS

| 4,392,522 A | 7/1983 | Bschorr |
| 6,244,314 B1 * | 6/2001 | Dodt et al. .............. 152/450 X |

FOREIGN PATENT DOCUMENTS

| DE | 2946273 | 5/1981 |
| DE | 3042350 | 5/1982 |
| DE | 4400912 | 7/1995 |
| GB | 2013143 | 8/1979 |

* cited by examiner

Primary Examiner—Adrienne C. Johnstone
(74) Attorney, Agent, or Firm—Greenblum & Bernstein, P.L.C.

(57) ABSTRACT

Motor vehicle wheel having a tire mounted on a rim and method of making the same. The wheel includes a ring made of a sound-absorbing material positioned inside the interior of the tire and encircling the rim. Threads are arranged to cover the ring to fix the ring to the rim. The threads are stretched over both sides of the ring one of towards or onto the rim. The method includes positioning the ring made of sound-absorbing material onto a circumferential area of the rim and stretching threads over the ring made of sound-absorbing material one of toward and onto the rim.

43 Claims, 3 Drawing Sheets

METHOD FOR FIXING A RING MADE OF A SOUND-ABSORBING MATERIAL ON A RIM AND MOTOR VEHICLE WHEEL HAVING A RING MADE OF SOUND-ABSORBING MATERIAL FIXED ON THE RIM

BACKGROUND OF THE INVENTION

1. Field of the Invention

The present invention relates to a method for fixing a ring of a sound-absorbing material on the circumferential area of a rim facing the interior of a tire mounted on the rim. The invention relates further to a motor vehicle wheel with a tire mounted on a rim in whose interior, encircling the rim, is positioned a ring made of a sound-absorbing material.

2. Discussion of Background Information

The tire vibrations produced during the rolling of the tire are known to be the main cause of the noise emitted by motor vehicles that is experienced as disturbing. In particular, the acoustic power produced in the tire torus is very high, with the acoustic oscillations created here being partially transferred via vehicle parts into the vehicle cabin and partially being radiated outward via the tire sidewalls. It is known that the incorporation of sound-absorbing materials into the tire interior reduces the acoustic power that is radiated.

Known, for instance, from German Patent No. DE 29 46 273 C2 is a device for reducing the tire noise of motor vehicles in which sound-absorbing and open-pore components are provided at the rim which extend into the interior of the tire without any contact with the interior tire surface.

The solution known from DE 44 00 912 A is concerned with realizing an effective reduction of the sound waves developing in the torus area, while taking into consideration an easy way of mounting and demounting. It is suggested here to introduce the sound-insulating material into a flexible hose which, due to its flexibility, can be mounted together with the tire onto the rim. The embodiment in the form of a hose includes the advantage of easy mounting. At higher speeds, in which the centrifugal forces that occur are already large, the comparatively loose fit of this assembly at the rim and its weight are disadvantageous.

From the German Patent DE 30 42 350 C2 a pneumatic vehicle tire is also known whose interior surfaces are partially or entirely covered with a sound-reducing coating of an open-pored foam. In order to achieve effective damping of the structure-borne noise in the frequency ranges that are particularly important physiologically, it is suggested here to use a special cross-linked polyurethane foam in a certain layer thickness that damps structure-borne noise.

Open-pore foam is particularly well suited by nature to lower the airborne sound level in the tire interior. One skilled in the art knows a number of foam materials that are well suited to individual requirements. In choosing the appropriate foam material, attention must be paid to a high level of sound absorption even at low frequencies. Furthermore, it is known that other materials also can be used for a sound absorption inside of a tire, for instance, sound-damping installations consisting of cotton, wool, felt, or other similar materials.

At higher speeds, in particular, the resistance to centrifugal forces of sound-insulating installations in the tire interiors is particularly important. The known solutions are not satisfying in that respect since the influence of centrifugal forces, in particular at higher speeds, causes undesired changes to occur in the sound-absorption characteristics due to deformations occurring in the material as well as due to changes in the cross-section of the installations. The sound absorbing material should therefore be as light in weight as possible.

SUMMARY OF THE INVENTION

An aspect of the invention is to provide a solution for the fixing or mounting of a sound-absorbing installation at the rim, comprising in particular of foam material, which ensures the desired resistance to centrifugal forces with practically no increase, or only an insignificant increase, in weight of the sound-reducing installation.

This aspect is obtained in the process according to the invention in that the ring of sound absorbing material is covered by threads which are stretched alongside the ring towards or onto the rim.

In relation to the motor vehicle wheel according to the invention, this aspect is obtained in that the ring of sound-absorbing material is fixed to the rim via threads covering it that are stretched on both sides of the ring towards or onto the rim.

The treads covering the sound-insulating installation in the tire effectively prevent undesired and/or negative deformations of the sound-absorbing material and are simultaneously capable of holding the sound absorbing installation in its position at the rim, even at high speeds. The invention also makes it possible to fix sound absorbing installations of different cross-sectional shapes to the rim.

It is advantageous for ensuring good resistance to centrifugal forces if the threads are directed in at least essentially radial and axial direction or, in relation to the circumferential direction of the rim, up to a diagonal direction.

According to a preferred embodiment of the invention these threads are the woof threads of a web or a web-like structure which is provided at each of its borders with at least one warp thread. Such a simple construction is quite sufficient to fix the sound-absorbing ring to the rim in a manner that is resistant to centrifugal forces.

In this embodiment, in particular, the fixing can take a particularly simple form in that the warp threads are mounting threads that can be pulled tight, in particular made of plastic or steel.

There are a multitude of possibilities for connecting the corresponding ends of the mounting threads to one another, in particular, tying, gluing, pressing, fusing, or sewing.

In order to prevent the sound absorbing ring from shifting it is usually sufficient when the mounting threads are prevented from slipping out of their position at the rim.

A simple possibility for preventing shifting is the provision of strips, moldings, or the like made of rubber or plastic at the rim where the mounting threads are stretched. Alternately, grooves can be provided at the rim which are meant to hold the mounting threads.

In another embodiment of the invention the mounting threads themselves can be made slip resistant, in particular rubberized.

In another variant of an embodiment of the invention the sound absorbing threads spanning the ring are clamped to the rim on both sides of the ring. This is also a version of the embodiment that can be handled relatively simply.

In order to facilitate the clamping of the threads they can be held by edge strips or the like, made, in particular, of rubber. In this case it is advantageous to clamp the edge strip on both sides of the sound-absorbing ring to the rim.

Again it is advantageous in this embodiment to provide additional measures against an unintentional slipping. To this end, the threads or the edge strips can be clamped to rubber moldings connected to the rim. As an additional measure to prevent slipping, these rubber moldings can be provided with circular grooves in which the clamping of the edge strips or the threads occurs.

The clamping itself can be accomplished in a simple manner by clamps such as stretchable tapes or the like.

In all variant embodiments the web or formation can be provided with additional threads spanning in the circumferential direction in order to facilitate handling thereof.

In an additional measure to facilitate handling, provision is made to glue the threads and/or the formation containing them to the sound absorbing ring before it is mounted onto the rim.

In another embodiment of the invention the threads spanning the ring are parts of a compact but acoustically transparent web.

In this case separate clamps can be omitted in that the web is stretched towards the rim or onto the rim by means of shrinkable threads, especially threads that shrink as a result of wetting. This simplifies handling, since separate attachment of the web to the rim is no longer necessary.

In a preferred embodiment the shrinkable threads can be woven in, at least in the edge strips of the web, where they are interwoven in the circumferential direction.

In an alternative form of the embodiment, provision is made for the shrinkable threads to be positioned in pockets of the web formed at the edges running in the circumferential direction. In an embodiment with interwoven shrinkable threads the production of the web is somewhat more expensive, and in the second embodiment the expense for the production of the pockets and later positioning of the threads in webs of simple design is even greater.

In another alternative embodiment of the web provision can be made for the web itself to be formed, at least in part, of shrinkable threads. Here, the entire web can be produced of shrinkable threads as well.

The handling of a web made of shrinkable threads is especially simple when, in particular, the web is mounted in a prefabbed ringlike closed form onto the sound-absorbing ring positioned on the rim.

An example for suitable material for the shrinkable rim is threads of PVA.

According to a particularly preferred embodiment of the invention the sound-absorbing ring is an open-pore foam ring. Foam is particularly well suited due to both its sound absorbing characteristics and its weight.

According to an aspect of the present invention, a method is provided for fixing a ring of sound-absorbing material to a rim of a wheel, the rim having a circumferential area facing an interior of a tire mounted on the rim. The method includes positioning a ring of sound-absorbing material onto the circumferential area of the rim; and stretching threads over the ring of sound-absorbing material one of toward and onto the rim.

According to another aspect of the invention, the threads are stretched over both sides of the ring, whereby the ring is held onto the rim by the threads. In yet another aspect of the invention, the threads are configured in a crossing pattern in a substantially perpendicular and substantially parallel orientation with respect to the circumferential direction of the rim. In another aspect of the present invention. In another aspect of the present invention, the threads are configured in a diagonally crossing orientation with respect the circumferential direction of the rim.

According to a further aspect of the present invention, a motor vehicle wheel having a tire mounted on a rim is provided. A ring made of a sound-absorbing material positioned inside the interior of the tire and encircling the rim; and threads arranged to cover the ring to fix the ring to the rim; wherein the threads are stretched over both sides of the ring one of towards or onto the rim.

In another aspect of the invention, the threads are configured in a crossing pattern to be oriented substantially perpendicular to and substantially parallel to the circumferential direction of the rim. According to still another aspect of the invention, the threads are configured in a diagonally crossing orientation with respect the circumferential direction of the rim. In another aspect of the invention, the threads form a web having a pair of edge areas, the web being formed to cover an exterior surface of the ring.

Other aspects of the invention include, the web having woof threads and at least one warp thread oriented in a circumferential direction in the area of each of the pair of edge areas. Further aspects of the invention include at least one warp thread being made of plastic or steel. According to other aspects of the invention, the at least one warp thread includes at least one mounting thread that can be pulled tight. According to another aspect of the invention, the at least one mounting thread is slip resistant.

According to a further aspect of the present invention, the at least one mounting thread is rubberized. According to a still further aspect of the invention, the rim is provided with grooves for accommodating the at least one mounting thread. According to another aspect of the invention, the at least one mounting thread is secured against slipping from its mounting position on the rim. In yet another aspect of the present invention, corresponding ends of the at least one mounting thread are connected with one another by at least one of tying, gluing, pressing, fusing and sewing.

Additionally, other aspects include additional threads, running in the circumferential direction of the rim, are interwoven into said web with said threads. Other aspects include the threads or the web containing the threads, are glued to the ring before the ring is mounted on the rim. In another aspect of the present invention, the web is compact and transparent. According to a further aspect of the present invention, the web is stretched one of toward or onto the rim by shrinkable threads.

In another aspect of the present invention, the shrinkable threads are positioned in pockets formed in the edge ,area of the web. According to a further aspect of the present invention, the shrinkable threads are interwoven into the edge areas of the web at least in the circumferential direction of the rim. In another aspect of the present invention, the shrinkable threads shrink upon exposure to moisture.

According to a still further aspect of the present invention, the shrinkable threads are made of PVA. In another aspect of the present invention, threads other than said shrinkable threads are made of one of nylon, rayon, polyester and aramid. According to a different aspect, the web is formed at least partially of shrinkable threads.

According to another aspect of the present invention, the web is positioned in a closed ring shape on the ring positioned on the rim. Further aspects of the invention include wherein one of resilient strips and moldings are used to mount the threads to the rim. Other aspects include, wherein the threads drawn along both sides of the ring are clamped tight onto the rim. According to other aspects of the present invention; the threads are held in resilient edge strips located on the rim. According to another aspect of the invention, the edge strips are made of rubber.

According to a further aspect of the invention, the edge strips are located on both sides of the rim. According to a still further aspect of the invention, at least one of the threads or the edge strips are clamped onto rubber moldings which are connected to the rim. According to another aspect of the invention, the at least one of the threads or the edge strips are glued onto the rubber moldings which are connected to the rim.

In yet another aspect of the invention, the strips and the moldings are made of one of plastic and rubber. According to another aspect of the present invention, the rubber moldings are provided with circumferential grooves. In yet another aspect of the present invention, the threads or the edge strips are clamped in grooves formed on the rim. In another aspect of the present invention, the threads or the edge strips are clamped to the rim via at least one clamping device. According to still a further aspect of the present invention, the at least one clamping device includes stretchable tape.

In another aspect of the invention, the ring is an open pore foam ring. According to a still further aspect of the invention, the ring has a substantially oval or substantially semicircular cross-section. According to a further aspect of the invention, the ring, in the area where it interfaces the rim, is formed to the corresponding profile of the rim.

Further aspects of the invention include, a sound-absorbing device for a motor vehicle wheel having a tire mounted on a rim. The device includes a ring made of a sound-absorbing material positioned inside the interior of the tire and encircling the rim. The ring is adapted to be fixed to the rim via threads covering the ring that are at least one of stretched, drawn and tightened over and both sides of the ring towards or onto the rim.

BRIEF DESCRIPTION OF DRAWINGS

The present invention is further described in the detailed description which follows, in reference to the noted plurality of drawings by way of non-limiting examples of exemplary embodiments of the, present invention, in which like reference numerals represent similar parts throughout the several views of the drawings, and wherein.

DETAILED DESCRIPTION OF THE INVENTION

Figure 1:
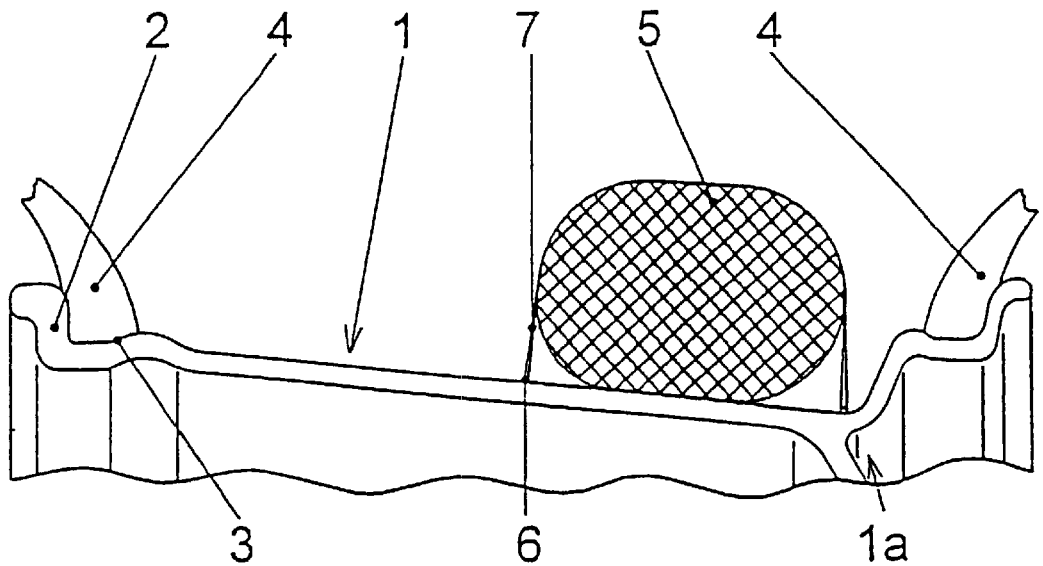
FIG. 1: is a partial cross-section of a rim with a tire and a first embodiment of the invention.

FIG. 1 shows a cross-section through a partial section of a rim 1 where the rim is provided with rim flanges 2 and seat surfaces 3 for the bead area 4 of a tire not depicted otherwise. The depicted rim 1 is by its design one of those rims for passenger vehicle tires that have a drop center 1a that is formed by the diagonal orientation of the rim area between the two bead seat areas. We note here that the present invention is not limited to a certain type of pneumatic tire or to a certain type of rim.

In the first exemplary embodiment of the invention shown in FIG. 1, positioned on the rim 1 is a ring 5 of sound-absorbing material, in particular made of an open-pore foam suited for absorption of airborne sound in the interior of tires, for instance a polyurethane foam or a melamine resin foam. As alternative materials to foams other materials that absorb airborne sounds well could be used as well, for instance felt, cotton, and materials of similar structure and similar texture. From here on reference will be made to a foam ring for the purpose of explaining the individual exemplary embodiments. However, the present invention is not limited to the utilization of foams, as mentioned.

The depicted foam ring 5 has in particular an oval or essentially oval cross-section and is positioned in the drop center area on the rim 1 in such a way that mounting of the tire onto the rim 1 is possible with an installed ring 5. The volume and/or the area of the cross-section of the foam ring 5 is designed in such a way that it does not interfere with the mounting of the tire onto the rim 1. Here, a foam ring with a semicircular cross-section would be well suited. It is further advantageous to adjust the cross-section of the foam ring to the rim profile.

Certainly, foam rings of most different cross-sections can be used in the framework of the present invention, as shown in the later description, which is one of the advantages of the present invention.

In installations that absorb airborne sound in tires, aside from facilitating mounting of the tire, it is particularly important that these installations have as low a weight as possible and that it is ensured that the sound-absorbing material does not deform at all or deforms only slightly as a result of the centrifugal forces that become clearly evident during rolling of the tire, especially at higher speeds. The required stability in centrifugal forces of such a sound-absorbing installation should ensure that the desired sound-absorbing characteristics, for which the sound-absorbing installations were designed in the first place, do not change at all or change only slightly in operation, which is to say during rolling of the tire or vehicle wheel. Additionally it shall be ensured that the other tire characteristics, for instance the concentricity, also remain unaffected as much as possible.

Due to these requirements the way such a foam ring 5 is mounted onto the rim 1 is of great importance. In accordance with the present invention the foam ring 5 is fixed to the rim 1 by threads covering it and is protected against deformation even at high centrifugal forces.

Figure 3:
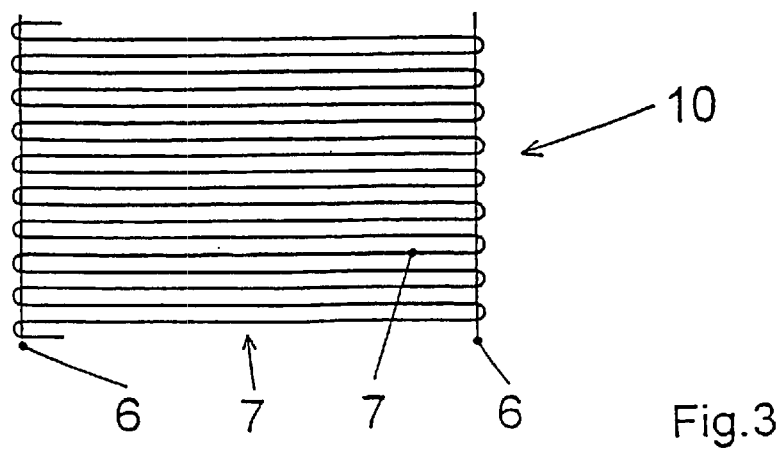
FIG. 3: is a top view of a section of a web as provided in the embodiments according to FIG. 1 and FIG. 2.

In a first embodiment of the invention these threads 7' are the woof threads of the web 10 whose design can be seen in FIG. 3. The web 10 has at least two warp threads referred to as mounting threads 6. A thread 7 is wrapped around these mounting threads 6, specifically, once around the mounting thread 6 and once around the other mounting thread 6 and back again, until a rather loose web 10 forms. The angle formed between the mounting threads 6 and the threads 7 is chosen to be, in particular, between 45 and 90°. In this context the number of these windings of the thread 7, the distance between the two mounting threads 6, as well as the longitudinal dimension of the web 10 thus formed are adjusted to the dimensions of the foam ring 5. The distance between the two mounting threads 6 is chosen such that they can be tightened under stress at the rim 1, touching it. The length of the mounting threads 6 is chosen particularly, to be larger than the outer circumference of rim 1 in the area where the receptacle is provided for the foam ring 5.

The foam ring 5 is pulled over the rim 1 and positioned in the desired position before the tire is mounted. Then the web 10, made in the manner described is placed over the foam ring 5 and the corresponding ends of the two mounting threads 6 are pulled tight and connected with one another. This should be done at the same time as the application of a certain stress, so that the ends of the mounting threads 6 can be connected with one another simply by tying. Alternately or additionally gluing, pressing by the use of suitable pressable sockets or the like, fusing, connecting by means of hooks, sewing etc. may be considered.

In order to securely prevent lateral slipping of the foam ring 5 mounted in this way on the rim 1 provision can be made for the mounting threads 6 to engage in grooves milled out of the rim 1 or already formed (pressed) therein during production of the rim, or can be held on the rim 1 by appropriate contact edges or the like.

Alternately, strips or moldings of rubber or plastic can be attached, for instance glued, onto the rim 1, which prevent slipping of the mounting threads. Here, it is also possible to design the mounting threads 6 themselves to be slip resistant by rubberizing them.

The handling of the foam ring 5 and the web 10 provided for the positioning and fixing thereof on the rim 1 can be simplified in another embodiment of the invention in that the web 10 and the foam ring 5 are first connected with one another by gluing. In this case the foam ring 5 can be positioned on the rim 1 as an open ring before the tire is mounted and be connected at its seams or faces also by gluing or the like.

In order to facilitate handling of the web 10 provision can additionally be made to join to the web, or interweave in the web 10, additional threads that circulate in the direction of the mounting threads 6. Here, it is sufficient when a distance of a few centimeters remains between these additional warp threads to enable easier handling.

As the material for the mounting threads 6 and any additional warp threads it is possible to use plastic threads, or even steel filaments for the mounting threads 6. The thread 7 forming the woof thread 7' can be made of a textile material like nylon, rayon, polyester, or an aramid.

Figure 2:
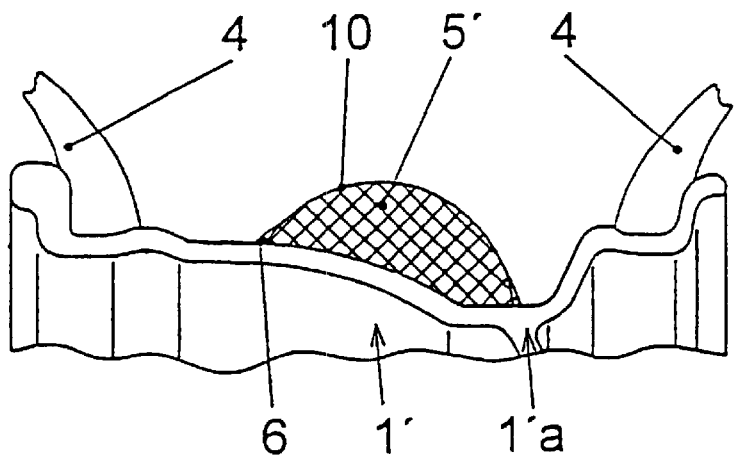
FIG. 2: is a second embodiment of the invention which is an analogous representation to FIG. 1.

In the embodiment depicted in FIG. 2 the rim 1' is provided with a distinct drop center 1'a. Here, the foam ring 5' can be designed in such a way that it extends into the drop center 1'a and that its cross-section, concerning its contact surface to the rim 1', is adjusted to the profile presented there. Otherwise, the foam ring 5' can be formed in similar fashion to the embodiment according to FIG. 1 and be mounted onto the rim 1' with a web 10 in the manner described.

Figure 4:
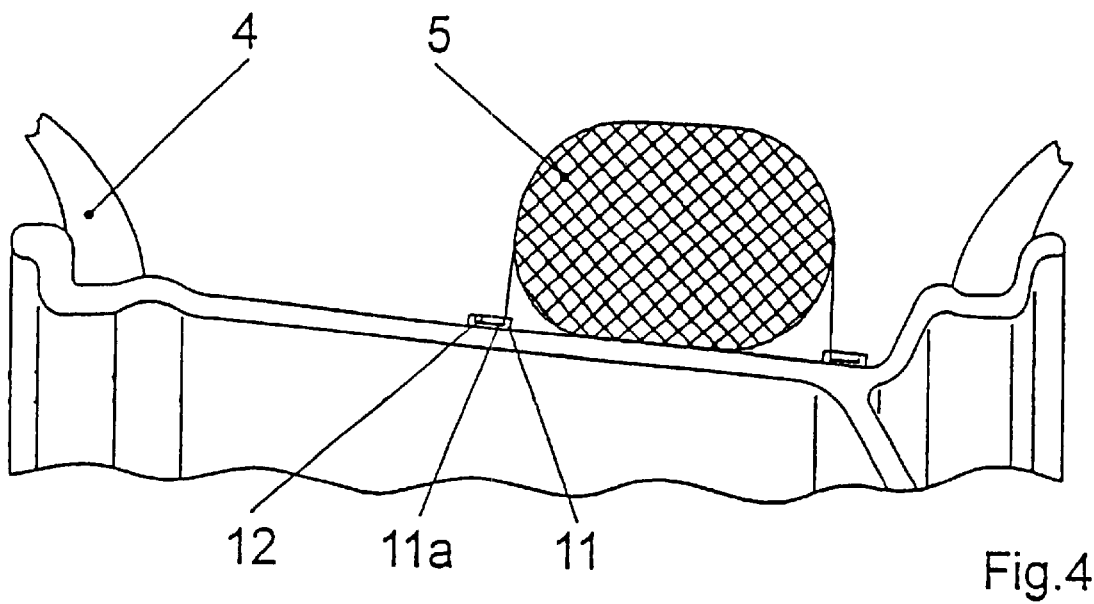
FIG. 4: is another exemplary embodiment of the invention which is an analogous representation to FIG. 1.
Figure 5:
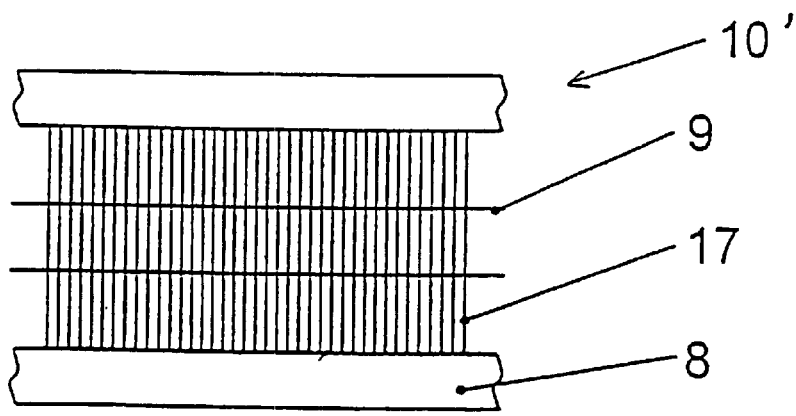
FIG. 5: is a view of a part of the structure provided for mounting the sound absorbing installation according to FIG. 4.
Figure 6:
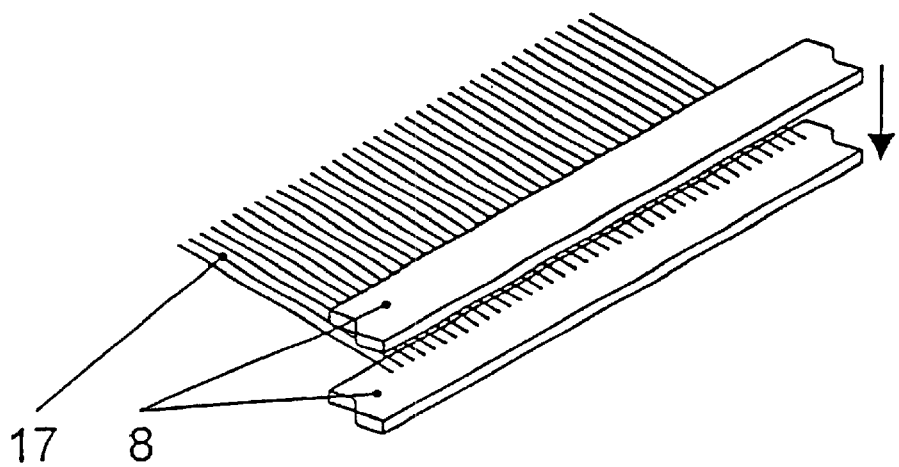
FIG. 6: illustrates the embodiment of the edges of the structure of FIG. 5.

A second possible embodiment for a formation 10' for mounting or fixing a foam ring 5 to a rim 1 is described in detail using FIG. 4 through FIG. 6. The design of the rim 1 and of the foam ring 5 resemble those according to FIG. 1. As depicted in FIG. 5 here too the construction 10' comprises of the textile threads 17 of the above mentioned material ranged laterally with respect to the rim 1 or the tire. Here, too, the threads 17 aligned at least essentially parallel to each other can be formed by continuous redirection of a single thread by 180° at an appropriate spacing or single threads of correlating threads can be used as base material. In this context, the threads 17 can also be directed diagonally or at an angle to the lateral direction of the rim 1 or the tire. In this embodiment mounting threads can be omitted since edge strips 8 of rubber or the like are provided which cover the edge areas of the threads or the single thread from both the top and the bottom at the two side edges and clamp them between each other. FIG. 6 here schematically shows the development of this side edge cover when single threads are used. The edge strips 8 can be made of unvulcanized rubber here and can be connected with the threads 17 and with one another after the connection by vulcanization, or they can be prevulcanized and glued.

Additionally, in this embodiment other threads 9, running in the circumferential direction, can be provided as depicted in FIG. 5, which make the formation 10' easier to handle. These threads 9 must allow the threads 17 the mobility necessary for mounting, since the formation 10' is mounted to the rim 1 in the area of its edge strips 8. Also in this embodiment, it is true that the dimensions of the formation 10' must be adjusted appropriately to those of the foam ring 5 and/or the rim 1 must be performed.

In another variation of this embodiment, not depicted, the edge strips can be omitted and the formation or web can be directly clamped to the rim at the edge area.

For fixing the foam ring 5 to the rim 1 first the foam ring 5 is positioned on the rim 1 then the formation 10' is pulled over it and the edge strips 8 or the edge areas without them are affixed to the rim 1 with separate clamps circling the rim 1.

In order to prevent accidental slipping of the edge strips 8 and their loosening from the clamps it is advantageous for there to be, in the relevant mounting areas on the rim 1, one circumferential groove provided or one rubber molding 11 applied, in particular glued, which molding is provided with a groove 11a for holding the edge strip 8 of the web 10'. Here, it is advantageous when the rubber molding 11 and/or its groove 11a are designed in such a way that the clamping device is also accommodated inside of this groove 11a. As a clamping device a tension band 12, a tensioning cable or the like can be used, for instance, the application of the necessary clamping tension can occur in the manner known from hose clamps or pallet tapes. This tension band is preferably made of plastic.

In this embodiment there is also the possibility to connect the formation 10' with the foam ring 5 by gluing before it is mounted onto the rim 1.

Figure 7:
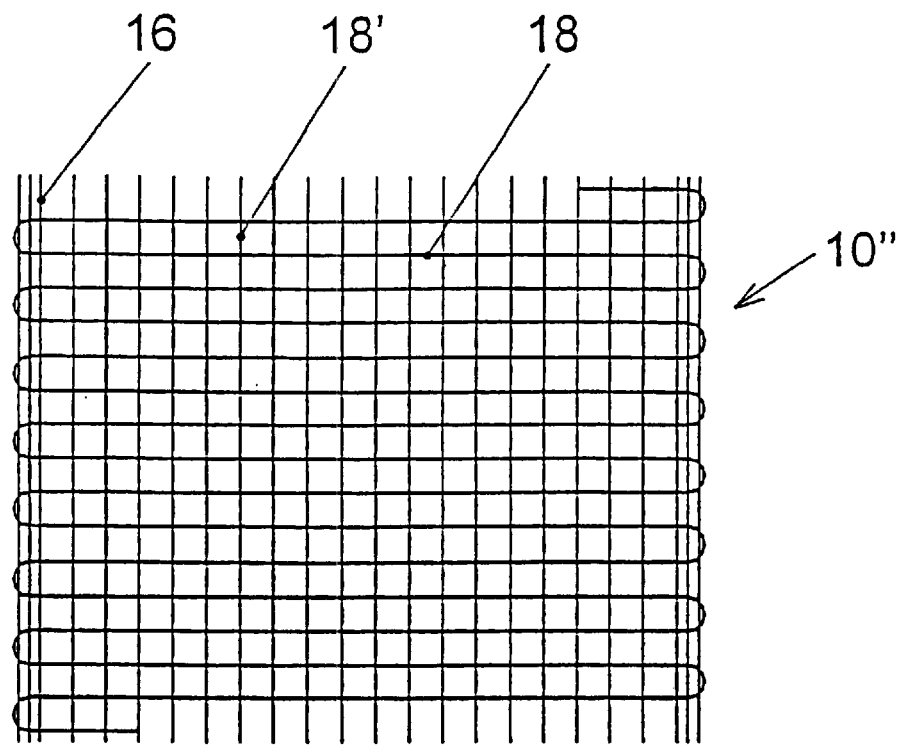
FIG. 7: illustrates a top view of a web with respect to another variant of the embodiment.
Figure 8:
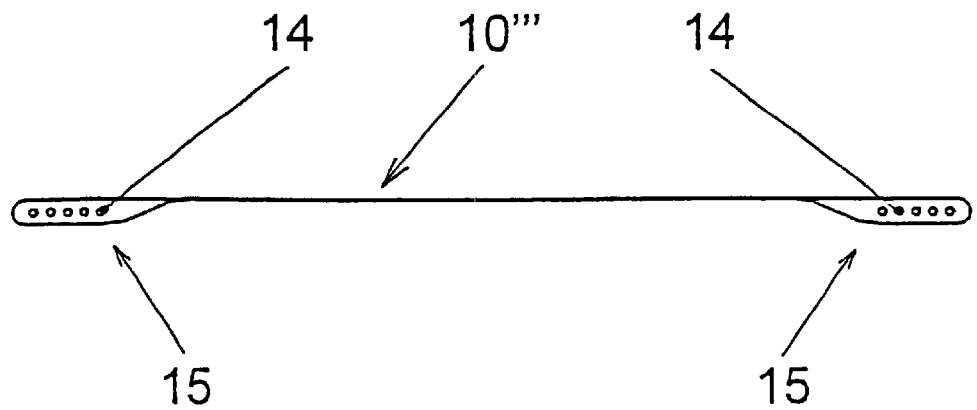
FIG. 8: illustrates a side view of a web with respect to another variant of the embodiment.

Additional embodiments of the invention are depicted in FIG. 7 and in FIG. 8. In both embodiments a comparatively compactly woven, vet acoustically transparent web 10", 10'" is provided, which consists of woof threads 18 and warp threads 18' interwoven with each other.

The special characteristic of web 10" is the shrinkable threads 16 woven in the area of the edges in the circumferential direction. Suitable as shrinkable threads 16 are threads made of PVA (polyvinyl alcohols), for instance PVA, Type AS by the Unitika company, where the material shrinks after moistening with water. The PVA threads 16 can also have a content of aramid fibers in order to improve the resistance of the threads to higher temperatures.

The web 10", joined together in the form of a ring and adjusted to the exterior diameter of the foam ring, is positioned onto the foam ring already mounted on the rim, and then the edges that contain the shrinkable threads 16 are moistened. The moistening can also be performed immediately before the mounting of the web 10". As a result of the moistening and subsequent drying, the threads 16 shrink and simultaneously tighten the web 10″ to that extent that the edges of the web 10″ contact the rim snugly. Thus the foam ring is fixed in its position on the rim.

FIG. 8 depicts an alternate embodiment with shrinkable threads 14. Here, the shrinkable threads 14 are not woven into the web 10‴ but rather the web 10‴ is folded over at both edge areas with the folded areas again being connected with the web 10‴, for instance by sewing or gluing, and pockets 15 are formed in the fold areas. The shrinkable threads 14 are inserted in the two pockets as clamping device.

Here too, the web 10‴ is closed in the form of a ring along with the threads 14 in order to be placed over the foam ring already positioned on the rim. As a result of moistening the pockets 15 along with the threads 14 the threads 14 shrink and thus reduce the radius at the edges of the web 10‴. This way the web 10‴ is tightened around the foam ring. The edges of the web 10‴ and/or the pockets 15 are pulled towards and onto the rim so that the foam ring is fixed on the rim.

It is also possible to produce the web itself of shrinkable threads, at least in part. The shrinkable threads can form the warp threads and/or the woof threads of the web. Further, the web can be used in such a way that shrinkable threads run in the circumferential and/or in the lateral direction, but it can also be used in such a way that the shrinkable threads run in a diagonal direction.

Further, it ought to be mentioned that, depending on the embodiment, shrinkable threads can be combined into yarns or cords.

There are a number of additional possible embodiments of the invention that are not depicted in the drawing figures. It is for instance possible to additionally glue the foam ring to the rim, with it being advantageous in this case, for the foam ring to be sheathed in the area to be glued to the rim. Additionally a layer of a material with poor thermal conductivity can be introduced between the rim and the foam ring in order to protect the foam from excessive heat. Of course, in all embodiments attention is paid to ensure that the geometry of the foam ring is adapted to the specific rim or to the tire to be mounted, at least enough that mounting of the tire on the rim is possible.

What is claimed is:

1. A motor vehicle wheel having a tire mounted on a rim, comprising:
   a ring made of a sound-absorbing material positioned inside the interior of the tire and encircling the rim; and
   threads covering said ring and fixing said ring to the rim;
   wherein said threads are stretched over both sides of said ring one of towards or onto the rim.

2. The motor vehicle wheel according to claim 1, wherein said threads are configured in a crossing pattern to be oriented substantially perpendicular to and substantially parallel to the circumferential direction of the rim.

3. The motor vehicle wheel according to claim 1, wherein said threads are configured in a diagonally crossing orientation with respect to the circumferential direction of the rim.

4. The motor vehicle wheel according to claim 1, wherein said threads form a web having a pair of edge areas, said web being formed to cover an exterior surface of said ring.

5. The motor vehicle wheel according to claim 4, wherein said web comprises woof threads and at least one warp thread oriented in a circumferential direction in the area of each of said pair of edge areas.

6. The motor vehicle wheel according to claim 5, wherein said at least one warp thread is made of plastic or steel.

7. The motor vehicle wheel according to claim 5, wherein said at least one warp thread comprises at least one mounting thread that can be pulled tight.

8. The motor vehicle wheel according to claim 7, wherein said at least one mounting thread is slip resistant.

9. The motor vehicle wheel according to claim 7, wherein said at least one mounting thread is rubberized.

10. The motor vehicle wheel according to claim 7, wherein the rim is provided with grooves for accommodating said at least one mounting thread.

11. The motor vehicle wheel according to claim 7, wherein said at least one mounting thread is secured against slipping from its mounting position on the rim.

12. The motor vehicle wheel according to claim 7, wherein corresponding ends of said at least one mounting thread are connected with each another by at least one of tying, gluing, pressing, fusing and sewing.

13. The motor vehicle wheel according to claim 4, wherein additional threads, running in the circumferential direction of the rim, are interwoven into said web with said threads.

14. The motor vehicle wheel according claim 4, wherein said threads or said web containing said threads, are glued to said ring before said ring is mounted on the rim.

15. The motor vehicle wheel according to claim 4, wherein said web is compact and acoustically transparent.

16. The motor vehicle wheel according to claim 4, wherein said web is stretched one of toward or onto the rim by shrinkable threads.

17. The motor vehicle wheel according to claim 16, wherein said shrinkable threads are positioned in pockets formed in said edge area of said web.

18. The motor vehicle wheel according to claim 16, wherein said shrinkable threads are interwoven into said edge areas of said web at least in the circumferential direction of the rim.

19. The motor vehicle wheel according to claim 16, wherein said shrinkable threads shrink upon exposure to moisture.

20. The motor vehicle wheel according to claim 16, wherein said shrinkable threads are made of polyvinyl alcohol (PVA).

21. The motor vehicle wheel according to claim 16, wherein threads other than said shrinkable threads are made of one of nylon, rayon, polyester and aramid.

22. The motor vehicle wheel according to claim 4, wherein said web is formed at least partially of shrinkable threads.

23. The motor vehicle wheel according to claim 4, wherein said web is positioned in a closed ring shape on said ring positioned on the rim.

24. The motor vehicle wheel according to claim 1, wherein one of resilient strips and moldings are used to mount said threads to the rim.

25. The motor vehicle wheel according to claim 1, wherein said threads drawn along both sides of said ring are clamped tightly onto the rim.

26. The motor vehicle wheel according to claim 1, wherein said threads are held in resilient edge strips located on the rim.

27. The motor vehicle wheel according to claim 26, wherein said edge strips are made of rubber.

28. The motor vehicle wheel according to claim 26, wherein said edge strips are located on both sides of the rim.

29. The motor vehicle wheel according to claim 26, wherein at least one of said threads or said edge strips are clamped onto rubber moldings which are connected to the rim.

30. The motor vehicle wheel according to claim 29, wherein said at least one of said threads or said edge strips are glued onto said rubber moldings which are connected to the rim.

31. The motor vehicle wheel according to claim 29, wherein said strips and said moldings are made of one of plastic and rubber.

32. The motor vehicle wheel according to claim 29, wherein said rubber moldings are provided with circumferential grooves.

33. The motor vehicle wheel according to claim 26, wherein said threads or said edge strips are clamped in grooves formed on the rim.

34. The motor vehicle wheel according to claim 26, wherein said threads or said edge strips are clamped to the rim via at least one clamping device.

35. The motor vehicle wheel according to claim 34, wherein said at least one clamping device comprises stretchable tape.

36. The motor vehicle wheel according to claim 1, wherein said ring is an open pore foam ring.

37. The motor vehicle wheel according to claim 1, wherein said ring has a substantially oval or substantially semicircular cross-section.

38. The motor vehicle wheel according to claim 1, wherein said ring, in the area where it interfaces the rim, is formed to the corresponding profile of the rim.

39. The motor vehicle wheel according to claim 1, wherein the threads covering said ring are stretched, drawn and tightened over and both sides of said ring towards or onto the rim.

40. A method for fixing a ring of sound-absorbing material to a rim of a wheel, the rim having a circumferential area facing an interior of a tire mounted on the rim, comprising:
   positioning a ring of sound-absorbing material onto the circumferential area of the rim; and
   stretching threads over the ring of sound-absorbing material one of toward and onto the rim,
   wherein the threads are stretched over both sides of the ring, whereby the ring is held onto the rim by the threads.

41. A method of making a motor vehicle wheel having a tire mounted on a rim, the motor vehicle wheel comprising:
   a ring made of a sound-absorbing material positioned inside the interior of the tire and encircling the rim; and
   threads covering said ring and fixing said ring to the rim;
   wherein said threads are stretched over both sides of said ring one of towards or onto the rim,
   the method comprising:
      positioning the ring made of sound-absorbing material onto a circumferential area of the rim; and
      stretching threads over the ring made of sound-absorbing material one of toward and onto the rim.

42. The method according to claim 41, wherein the threads are configured in a crossing pattern in a substantially perpendicular and substantially parallel orientation with respect to the circumferential direction of the rim.

43. The method according to claim 41, wherein the threads are configured in a diagonally crossing orientation with respect the circumferential direction of the rim.

\* \* \* \* \*